Figure 1:
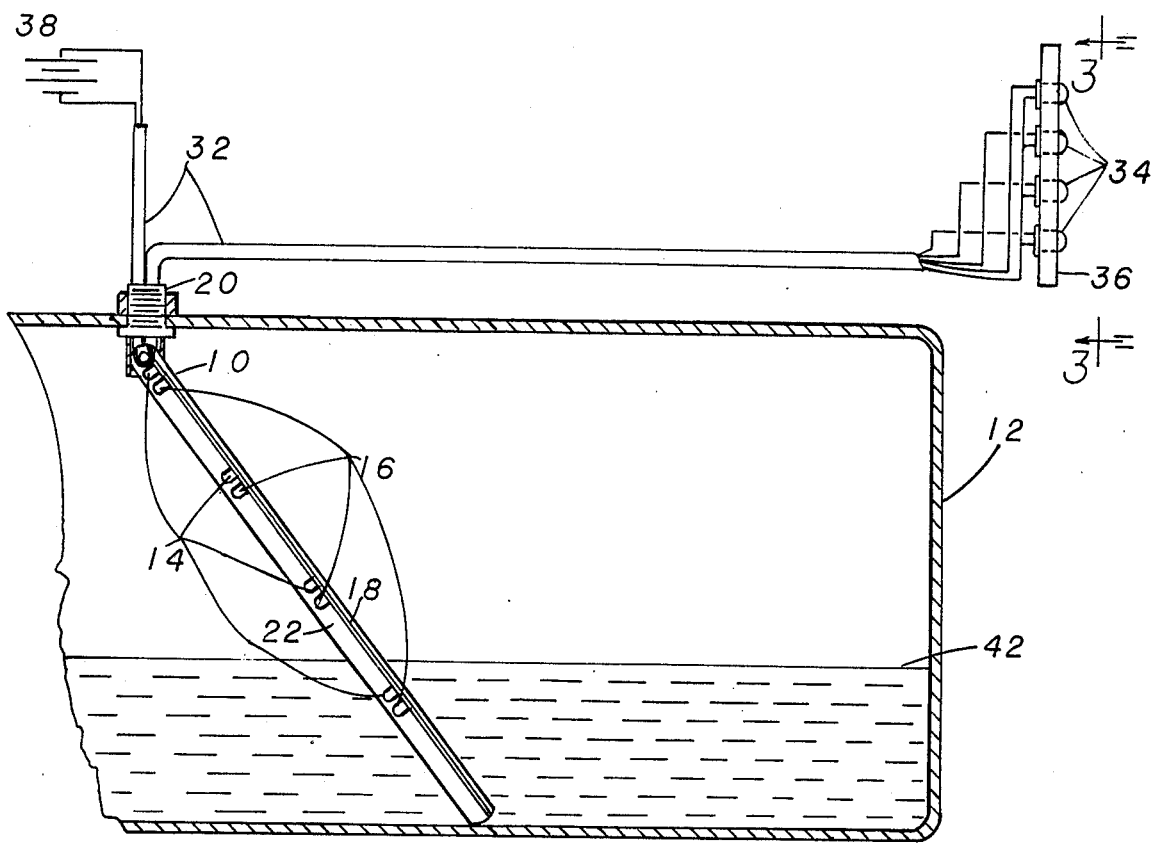

United States Patent [19]

Hastbacka

[11] 4,051,726
[45] Oct. 4, 1977

[54] ELECTRO-OPTICAL LIQUID LEVEL INDICATOR

[76] Inventor: Albin A. Hastbacka, 3 Singlefoot Road, Chelmsford, Mass. 01824

[21] Appl. No.: 674,214

[22] Filed: Apr. 6, 1976

[51] Int. Cl.² .............................................. G01F 23/00
[52] U.S. Cl. .................... 73/290 R; 250/577
[58] Field of Search .......................... 73/290 R, 293; 340/244 R, 244 C; 250/577, 227

[56] References Cited

U.S. PATENT DOCUMENTS

| 2,976,763 | 3/1961 | McKeag | 340/244 R |
| 3,120,125 | 2/1964 | Vasel | 73/293 |
| 3,192,392 | 6/1965 | Reed | 250/227 |

*Primary Examiner*—S. Clement Swisher

[57] ABSTRACT

A liquid level indicator consisting of a transparent rod within which is embedded a plurality of infrared emitters and photosensors. The infrared emitters and photosensors are mounted to a substrate which places the emitters and sensors in such a geometry as to cause total internal reflection off the transparent rod surface when an emitter-sensor pair is above the liquid level and to minimize internal reflection when an emitter-sensor pair is immersed in the liquid. The emitters are activated by electric current via conductive paths which are part of the supporting substrate. The sensors provide electric currents to an external readout device to indicate the absence or presence of liquid between emitter-sensor pairs. The liquid level indicator is made relatively insensitive to ambient light by shading the sensors from all but the desired infrared rays from the emitters. The liquid level indicator is hinged to allow a given length indicator assembly to be used in a variety of container depths.

4 Claims, 4 Drawing Figures

ELECTRO-OPTICAL LIQUID LEVEL INDICATOR

DISCLOSURE OF INVENTION

This invention relates to liquid level indicators and more specifically to a liquid level indicator utilizing infrared emitters and photosensors. The utilization of light emitters and light sensors in liquid level indicators is known. An example of such a liquid level indicator is shown in U.S. Pat. No. 3,120,125 issued Feb. 4, 1964. In utilizing this particular form of liquid level indicator, the device is relatively difficult to fabricate, is sensitive to ambient light, and is subject to false liquid level readings because of the tendency for liquid droplets to cling to a horizontally oriented surface.

Accordingly, it is a principal object of the present invention to provide a liquid level indicator which is simple to manufacture, is relatively insensitive to ambient light, minimizes the tendency for liquid droplets to cling to the reflecting surface, and has a high ratio of sensor current when in air to sensor current when immersed in a liquid.

Another object of this invention is to provide a device of the above character which easily accomodates measuring the liquid level within containers of many different depths utilizing one type of device.

These and other objects of this invention are accomplished by utilizing a transparent rod within which is embedded a plurality of infrared emitters and photosensors. The infrared emitters and photosensors are mounted to a supporting substrate which places the emitters and sensors in such a relative geometry as to cause total internal reflection of infrared rays from the emitter at a position on the transparent rod surface approximately midway between the emitter and sensor when an emitter-sensor pair is located in air or other gas whose index of refraction is comparable to air. The emitter-sensor geometry is such as to minimize internal reflection at the transparent rod surface at a position approximately midway between the emitter and sensor when the emitter-sensor pair is immersed in a liquid whose index of refraction is approximately the same as the index of refraction of the transparent rod.

The emitters are activated by electric current via conductive paths which are part of the supporting substrate.

The sensors provide a current to external circuitry to indicate the absence or presence of a liquid between emitter-sensor pairs.

The fluid level indicator is made relatively insensitive to extraneous ambient light by shading the sensors from all but the desired rays of light from the emitters.

Figure 2:
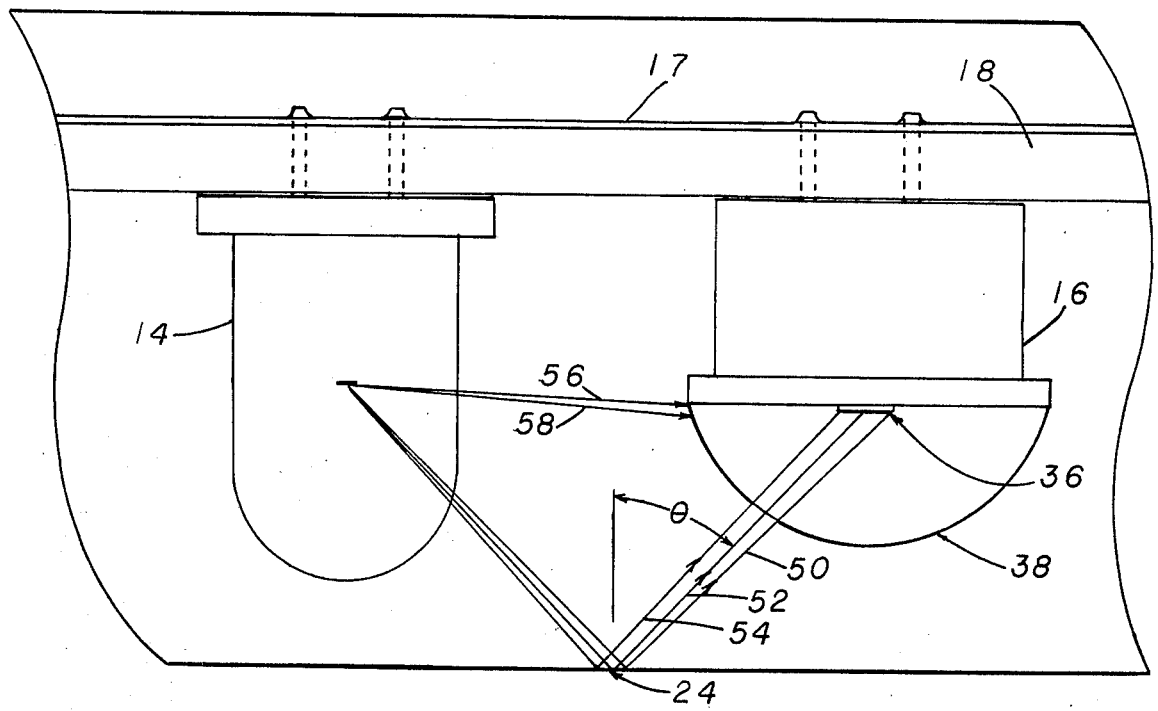
Figure 3:
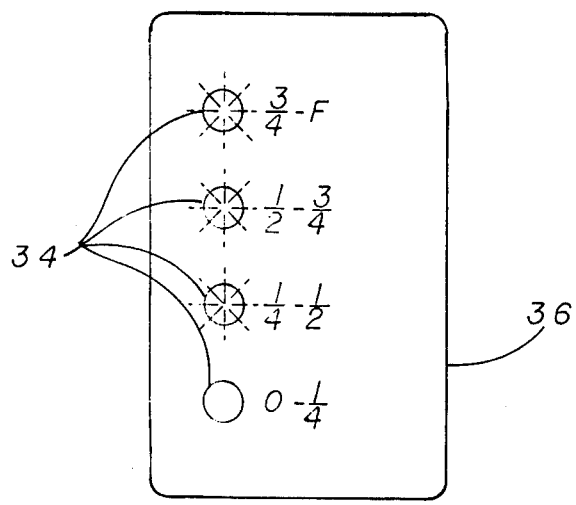

The invention will be best understood by reference to the following description of a preferred embodiment and the associated drawings in which:

FIG. 1 generally illustrates a device according to the invention for detecting the liquid level in a container FIG. 2 is a detailed view showing the geometry of an emitter-sensor pair FIG. 3 is a view of the remote viewing as taken along lines 3—3 of FIG. 1

Figure 4:
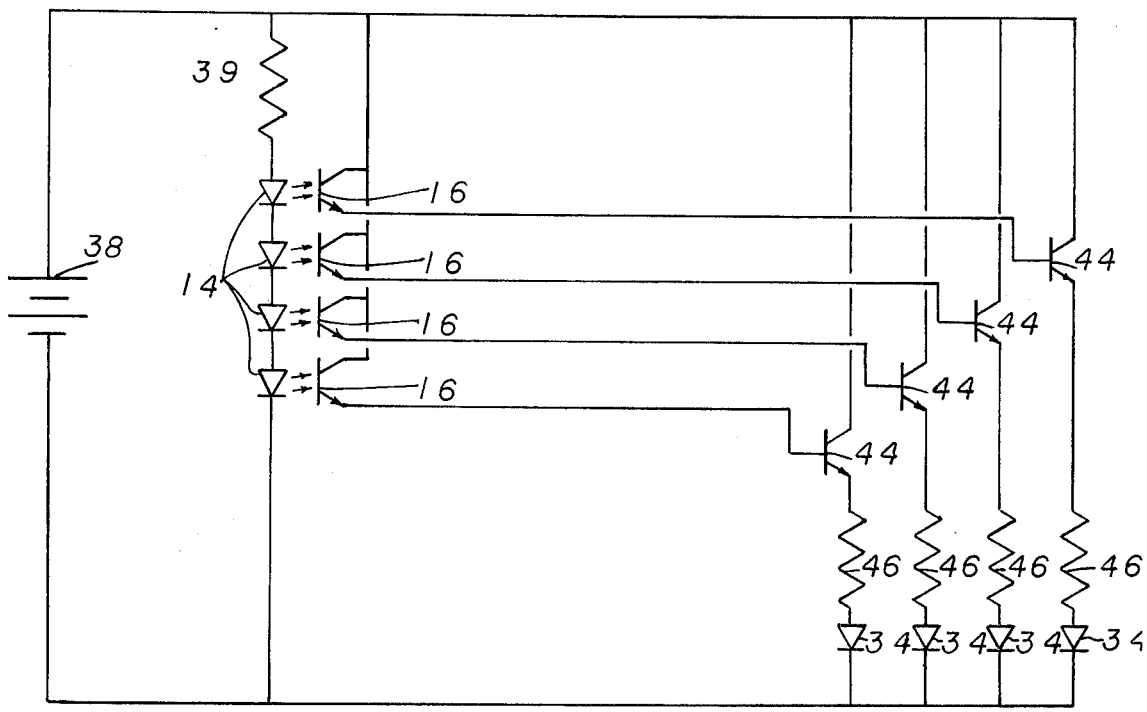

FIG. 4 is a schematic circuit diagram of the liquid level indicator

Referring to FIG. 1, wherein like numerals have been employed to designate similar parts throughout the various views, it will be seen that for the purpose of illustration, one practical application of the present invention a liquid level indicator of the type contemplated hereby is designated generally by the numeral 10, and is shown in a container 12, which may be, for example, a fuel tank containing gasoline. This example is cited for illustration only. Other examples will be obvious to one skilled in the art.

The indicator 10 is comprised of a substrate 18 upon which are mounted infrared emitters 14 and photosensors 16. The substrate 18, emitters 14, and sensors 16 are embedded in a transparent rod 22. The preferred embodiment for the transparent rod 22 is a clear thermosetting plastic such as Maraglas Epoxy Resin, but it should be understood that the rod 22 may be made of other clear plastics such as acrylic, polycarbonate, polysulfone, diglycol carbonate, or polyamide; clear rubber such as silicone RTV; or clear glass.

The transparent rod 22 is hinged to a threaded length of tubing 20 which provides an opening to allow wires 32 to enter the container 12 to supply drive current from the power source 38 to the emitters 14 and to provide current from the sensors 16 to the remote viewing device 36.

Referring to FIGS. 1, 2, and 4, an emitter 14 is connected to conductive paths on the substrate 18 which activate the infrared emitter 14. The emitter 14 shown in FIG. 2 and 4 is a gallium arsenide infrared emitter but it is to be understood that the emitter may be a tungsten filament lamp, neon lamp, or other type of light source.

The photosensor 16 is connected to conductive paths 17 on the substrate 18 which carry electric current outside of the container 12. The photosensor 16 shown in FIG. 2 and 4 is a silicon phototransistor but it is to be understood that the sensor 16 may be a photodiode, photoconductive cell, or similar photosensitive device.

The photosensitive element 36 of the sensor 16 is placed in such a position as to receive infrared rays 50, 52, 54 from the emitter 14 after reflection from the rod surface 24, but not to receive any direct infrared rays 56, 58 from the emitter 14. The nominal angle $\theta$ of the relected rays 52 from the emitter 14 received by the photosensitive element 36 is such as to be greater than the critical angle for total reflection when the rod surface 24 is in air or other gas whose approximate index of refraction is 1.0. The angle $\theta$ is less than the critical angle for total reflection when the rod surface 24 is immersed in a liquid whose approximate index of refraction is in the range of 1.3 to 1.5. Typical values of $\theta$ range from a nominal 44° when the ratio of the index of refraction of the liquid to the rod index of refraction is 0.85 to a nominal 54° when the ratio is 0.95. If $\theta$ is made a nominal 48°, the ratio of on current (when the sensor 16 receives totally reflected light) to off current (when the sensor 16 receives partially reflected light) is sufficiently high so as to provide satisfactory operation of the liquid level indicator when used with a variety of liquids.

The rod surface illustrated in FIG. 2 is a flat surface, however a segment of a cylindrical surface, or a segment of an ellipsoidal surface can also be used to implement the liquid level indicator. The use of a rod surface 24 which is a segment of a cylindrical or ellipsoidal surface provides the ability to focus light rays reflected from the rod surface 24 to be focused upon the photosensor 16.

The photosensitive element 36 is placed sufficiently distant from the rod surface 24 so as to collect a narrow band (typically ± 3°) of infrared rays 50, 52, 54 which are all totally reflected when the rod surface 24 is in air and to collect only rays which are not totally reflected when the rod surface 24 is immersed in a liquid. By proper geometrical placement of the sensor 16 relative to the emitter 14 and the rod surface 24 as stated above, the sensor 16 will output a current when immersed in air which is typically more than 100 times the current when the sensor 16 is placed in a liquid such as gasoline. The current from a sensor 16 is amplified (as shown in FIG. 4) and brought to light emitting diodes 34 to remotely indicate the absence or presence of a liquid at a rod surface 24. By utilizing a plurality of emitters 14 and sensors 16, the liquid level within the container 12 may be indicated to any desired resolution.

If the indicator 10 is to be utilized in a container 12 where the ambient light level is such as to interfere with the operation of the sensor 16, an opaque coating is applied to the lens 38 of the sensor 16 except for a small area which allows the infrared rays 50, 52, 54 from the rod surface 24 to be sensed by the photosensitive element 36. Alternatively, the rod 22 may be made opaque except in the volume where infrared rays from an emitter 14 are transmitted to a rod surface 24 and reflected to a sensor 16.

The indicator 10 is hinged to a threaded tubing 20 to allow a given length indicator 10 to be used in a variety of container 12 sizes. As long as the container 12 depth is less than the length of the indicator 10, the indicator will provide the proper indication of liquid level. An alternative to having the indicator 10 mounted from the container 12 top is to permanently affix the indicator to a container 12 side or to make it an integral part of a container 12 side.

FIG. 1, when the liquid level 42 is between the first and second pair of emitters 14 and sensors 16, the current from the top three sensors 16 will be sufficiently large as to activate the top three light emitting diodes 34 of the remote viewing device 36 and the current from the bottom sensor will be insufficient to activate the bottom light emitting diode of the remote viewing device 36. The resulting remote presentation of the liquid level will be as shown in the remote viewing device 36 shown in FIG. 3. In the example shown in FIG. 1, the top three light emitting diodes 34 emit a visible light output and the lower emitting diode is off to show that the liquid level is down to between ¼ to ½ full within the container 12.

Referencing FIG. 4, the schematic circuit diagram for the liquid level indicator is shown. The infrared emitters 14 are connected in series with a resistor 39 and voltage source 38. This type of circuit assures that the current through each infrared emitter 14 is identical and tends to minimize intensity variations among the infrared emitters 14. Each photosensor 16 is shown connected to a transistor 44 which amplifies the sensor 16 current output so as to be sufficient to drive the light emitting diodes 34 to be visible when an emitter 14-sensor 16 pair is in air and to be off when an emitter 14-sensor 16 pair in in the liquid. Resistors 46 are used to limit the maximum current through the light emitting diodes 34. The circuit shown in FIG. 4 is physically distributed with the preferred embodiment such that the voltage source 38 is an external battery or other direct current power source and the infrared emitters 14, resistor 39, light sensors 16, transistors 44, and resistors 46 are attached to etched circuit wiring on the substrate 18, with the light emitting diodes 34 being mounted to the remote viewing device 36. The circuit shown in FIG. 4 is presented as an illustration only because other embodiments can readily be implemented by one skilled in the art. For example, the transistors 44 could be connected to a logic circuit which displays the liquid level on a hexadecimal digit display so that when the container is full, the display presents an F and when the container is empty, the display presents an E.

What is claimed is:

1. A liquid level indicating device comprising:
   a transparent rod which is capable of being inserted into a container holding a liquid
   a plurality of infrared emitters and photosensors within the transparent rod wherein a photosensor is placed sufficiently distant from the rod surface and an infrared emitter so as to collect a narrow band of infrared rays which are all totally reflected when the emitter-sensor pair is in air and to collect only rays which are not totally reflected when the emitter-sensor pair is immersed in a liquid; a substrate with conductive paths embedded within the transparent rod which provide for the means to drive the infrared emitters with electric current and provide the output path for sensing current from the photosensors; and a remote viewing device whereby the level of the liquid in the container is indicated by selective illumination of visible light emitting diodes in a remote viewing device.

2. A liquid level indicating device as in claim 1 wherein the photosensors are shielded from ambient light by covering the photosensor with an opaque material except for the aperture where light rays from the infrared emitter is reflected off the surface of the transparent rod and enters the photosensor.

3. A liquid level indicating device as in claim 1 wherein the transparent rod is hinged to a fixture so that it may be used in a variety of containers.

4. A liquid level indicating device as in claim 1 wherein the transparent rod is made of a material selected from the group consisting of plastic, rubber, and glass.

* * * * *